(12) United States Patent
Rukhovich et al.

(10) Patent No.: US 12,462,417 B2
(45) Date of Patent: Nov. 4, 2025

(54) METHOD AND ELECTRONIC DEVICE FOR 3D OBJECT DETECTION USING NEURAL NETWORKS

(71) Applicant: SAMSUNG ELECTRONICS CO., LTD., Suwon-si (KR)

(72) Inventors: Danila Dmitrievich Rukhovich, Moscow (RU); Anna Borisovna Vorontsova, Moscow (RU); Anton Sergeevich Konushin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 18/080,482

(22) Filed: Dec. 13, 2022

(65) Prior Publication Data

US 2023/0121534 A1 Apr. 20, 2023

Related U.S. Application Data

(63) Continuation of application No. PCT/KR2022/007472, filed on May 26, 2022.

(30) Foreign Application Priority Data

May 26, 2021 (RU) ................................ 2021114905
Oct. 4, 2021 (RU) ................................ 2021128885

(51) Int. Cl.
*G06T 7/70* (2017.01)
*G06T 15/10* (2011.01)
(Continued)

(52) U.S. Cl.
CPC ................ *G06T 7/70* (2017.01); *G06T 17/00* (2013.01); *G06V 10/771* (2022.01); *G06V 10/82* (2022.01);
(Continued)

(58) Field of Classification Search
CPC . G06T 7/70; G06T 17/00; G06T 2207/20081; G06T 2207/30252;
(Continued)

(56) References Cited

U.S. PATENT DOCUMENTS 9,424,461 B1 8/2016 Yuan et al.
10,970,518 B1 4/2021 Zhou et al.
(Continued)

FOREIGN PATENT DOCUMENTS

CN 110689008 A 1/2020
CN 111932530 A 11/2020
(Continued)

OTHER PUBLICATIONS

Kim, Jiwon, et al. "Monocular 3D object detection for an indoor robot environment." 2020 29th IEEE International Conference on Robot and Human Interactive Communication (RO-MAN). IEEE, 2020. (Year: 2020).*
(Continued)

*Primary Examiner* — Amandeep Saini
*Assistant Examiner* — Andrew S Budisalich
(74) *Attorney, Agent, or Firm* — Sughrue Mion, PLLC (57) ABSTRACT

A method of 3D object detection using an object detection neural network includes: receiving one or more monocular images; extracting 2D feature maps from each one of the one or more monocular images by passing the one or more monocular images through a 2D feature extracting part of the object detection neural network, generating an averaged 3D voxel volume based on the 2D feature maps, extracting a 2D representation of 3D feature maps from the averaged 3D voxel volume by passing the averaged 3D voxel volume through an encoder of a 3D feature extracting part of the object detection neural network, and performing 3D object detection as 2D object detection in a Bird's Eye View (BEV)
(Continued)

plane, the 2D object detection in the BEV plane being performed by passing the 2D representation of 3D feature maps through thane outdoor object detecting part of the object detection neural network.

17 Claims, 4 Drawing Sheets

(51) Int. Cl.
```
G06T 17/00      (2006.01)
G06V 10/40      (2022.01)
G06V 10/771     (2022.01)
G06V 10/82      (2022.01)
G06V 20/64      (2022.01)
```
(52) U.S. Cl.
CPC ............... *G06T 2207/20081* (2013.01); *G06T 2207/30252* (2013.01); *G06V 2201/07* (2022.01)

(58) Field of Classification Search
CPC ...... G06T 15/10; G06V 10/771; G06V 10/82; G06V 2201/07; G06V 20/647; G06V 10/40
See application file for complete search history.

(56) References Cited

U.S. PATENT DOCUMENTS

| | | | |
|---|---|---|---|
| 11,037,051 B2 | 6/2021 | Kim et al. | |
| 11,100,669 B1* | 8/2021 | Zhou | G01S 13/867 |
| 2016/0196480 A1 | 7/2016 | Heifets et al. | |
| 2019/0138786 A1 | 5/2019 | Trenholm et al. | |
| 2020/0294257 A1 | 9/2020 | Yoo | |
| 2021/0065440 A1 | 3/2021 | Sunkavalli et al. | |
| 2021/0097717 A1 | 4/2021 | Wang et al. | |
| 2021/0103776 A1 | 4/2021 | Jiang et al. | |
| 2021/0146839 A1 | 5/2021 | Kim et al. | |
| 2021/0146952 A1 | 5/2021 | Vora et al. | |
| 2021/0390714 A1* | 12/2021 | Guizilini | G06V 10/764 |
| 2023/0026857 A1* | 1/2023 | Di | G01V 1/48 |
| 2023/0037958 A1* | 2/2023 | Liba | G06T 7/50 |
| 2023/0222817 A1* | 7/2023 | Sun | G06N 3/08 382/103 |

FOREIGN PATENT DOCUMENTS

| | | |
|---|---|---|
| CN | 112116700 A | 12/2020 |
| CN | 112287860 A | 1/2021 |
| CN | 112712062 A | 4/2021 |
| RU | 2693267 C1 | 7/2019 |
| WO | 2021/042208 A1 | 3/2021 |

OTHER PUBLICATIONS

Communication issued Jun. 8, 2022 by the Russian Patent Office in counterpart Russian Patent Application No. 2021128885.
Communication issued Jun. 9, 2022 by the Russian Patent Office in Russian Patent Application No. 2021128885.
International Search Report (PCT/ISA/210) issued Sep. 14, 2022 by the International Searching Authority in International Application No. PCT/KR2022/007472.
Written Opinion (PCT/ISA/237) issued Sep. 14, 2022 by the International Searching Authority in International Application No. PCT/KR2022/007472.
W. Bao, B. Xu, and Z. Chen, "MonoFENet: Monocular 3D Object Detection with Feature Enhancement Networks", IEEE Transactions on Image Processing, Journal of Latex Xlass Files, vol. 14, No. 8, Aug. 2015, (13 pages total).
G. Brazil and X. Liu, "M3D-RPN: Monocular 3D Region Proposal Network for Object Detection", In Proceedings of the IEEE/CVF International Conference on Computer Vision, pp. 9287-9296, 2019, (10 pages total).
H. Caesar et al., "nuScenes: A multimodal dataset for autonomous driving", Proceedings of the IEEE/CVF conference on computer vision and pattern recognition, pp. 11621-11631, 2020, (11 pages total).
F. Chabot et al., "Deep Manta: A Coarse-to-fine Many-Task Network for joint 2D and 3D vehicle analysis from monocular image", In Proceedings of the IEEE conference on computer vision and pattern recognition, pp. 2040-2049, 2017, (10 total pages).
K. Chen et al., "MMDetection: Open MMLab Detection Toolbox and Benchmark", arXiv:1906.07155v1 [cs.CV], Jun. 17, 2019, (13 total pages).
Chen et al., "Monocular 3D Object Detection for Autonomous Driving", In Proceedings of the IEEE Conference on Computer Vision and Pattern Recognition, pp. 2147-2156, 2016, (10 pages total).
Chen et al., "MonoPair: Monocular 3D Object Detection Using Pairwise Spatial Relationships", In Proceedings of the IEEE/CVF Conference on Computer Vision and Pattern Recognition, pp. 12093- 12102, 2020, (10 pages total).
Choi et al., "Understanding Indoor Scenes using 3D Geometric Phrases", In Proceedings of the IEEE Conference on Computer Vision and Pattern Recognition, pp. 33-40, 2013, (8 pages total).
Dai et al., "ScanNet: Richly-annotated 3D Reconstructions of Indoor Scenes", In Proceedings of the IEEE Conference on Computer Vision and Pattern Recognition, www.scan-net.org, pp. 5828-5839, 2017, (12 pages total).
Ding et al., "Learning Depth-Guided Convolutions for Monocular 3D Object Detection", In Proceedings of the IEEE/CVF Conference on Computer Vision and Pattern Recognition Workshops, pp. 1000-1001, 2020, (10 pages total).
Ding et al., "VoteNet: A Deep Learning Label Fusion Method for Multi-Atlas Segmentation", International Conference on Medical Image Computing and Computer-Assisted Intervention, pp. 202-210, arXiv:1904.08963v2 [cs. CV], May 31, 2019, (9 pages total).
A. Geiger, P. Lenz, and R. Urtasun, "Are we ready for Autonomous Driving? The KITTI Vision Benchmark Suite", In 2012 IEEE Conference on Computer Vision and Pattern Recognition, pp. 3354-3361, IEEE, 2012, (8 pages total).
K. He et al., "Deep Residual Learning for Image Recognition", In Proceedings of the IEEE conference on Computer Vision and Pattern Recognition, pp. 770-778, 2016, (9 pages total).
J. Hou et al., "3D-SIS: 3D Semantic Instance Segmentation of RGB-D Scans", In Proceedings of the IEEE/CVF Conference on Computer Vision and Pattern Recognition, pp. 4421-4430, 2019, (10 pages total).
S. Huang et al., "Cooperative Holistic Scene Understanding: Unifying 3D Object, Layout, and Camera Pose Estimation", arXiv:1810.13049, 2018, (12 pages total).
S. Huang et al., "Holistic 3D Scene Parsing and Reconstruction from a Single RGB Image", In Proceedings of the European Conference on Computer Vision (ECCV), pp. 187-203, 2018, (17 pages total).
M. Jaritz et al., "Multi-view PointNet for 3D Scene Understanding", In Proceedings of the IEEE/CVF International Conference on Computer Vision Workshops, 2019, (9 pages total).
E. Jorgensen et al., "Monocular 3D Object Detection and Box Fitting Trained End-to-End Using Intersection-over-Union Loss", arXiv:1906.08070v2 [cs.CV], Jun. 20, 2019, (10 pages total).
H. Konigshof et al., "Realtime 3D Object Detection for Automated Driving Using Stereo Vision and Semantic Information", In 2019 IEEE Intelligent Transportation Systems Conference (ITSC), pp. 1405-1410, IEEE, 2019, (6 pages total).
J. Ku et al., "Monocular 3D Object Detection Leveraging Accurate Proposals and Shape Reconstruction", In Proceedings of the IEEE/CVF Conference on Computer Vision and Pattern Recognition, pp. 11867-11876, 2019, (10 pages total).
A. Kundu et al., "3D-RCNN: Instance-level 3D Object Reconstruction via Render-and-Compare", In Proceedings of the IEEE Conference on Computer Vision and Pattern Recognition, pp. 3559-3568, 2018, (10 pages total).

(56) References Cited

OTHER PUBLICATIONS

Lang et al., "PointPillars: Fast Encoders for Object Detection from Point Clouds", In Proceedings of the IEEE/CVF Conference on Computer Vision and Pattern Recognition, pp. 12697-12705, 2019, (9 pages total).
B. Li et al., "GS3D: An Efficient 3D Object Detection Framework for Autonomous Driving", In Proceedings of the IEEE/CVF Conference on Computer Vision and Pattern Recognition, pp. 1019-1028, 2019, (10 pages total).
P. Li, X. Chen, and S. Shen, "Stereo R-CNN based 3D Object Detection for Autonomous Driving", In Proceedings of the IEEE/CVF Conference on Computer Vision and Pattern Recognition, pp. 7644-7652, 2019, (9 pages total).
P. Li et al., "RTM3D: Real-time Monocular 3D Detection from Object Keypoints for Autonomous Driving", arXiv:2001.03343v1 [cs.CV], Jan. 10, 2020, (11 pages total).
Z. Liu et al., "SMOKE: Single-Stage Monocular 3D Object Detection via Keypoint Estimation", In Proceedings of the IEEE/CVF Conference on Computer Vision and Pattern Recognition Workshops, pp. 996-997, 2020, (10 pages total).
X. Ma et al., "Accurate Monocular 3D Object Detection via Color-Embedded 3D Reconstruction for Autonomous Driving", In Proceedings of the IEEE/CVF International Conference on Computer Vision, pp. 6851-6860, 2019, (10 pages total).
A. Mousavian et al., "3D Bounding Box Estimation Using Deep Learning and Geometry", In Proceedings of the IEEE Conference on Computer Vision and Pattern Recognition, pp. 7074-7082, 2017, (9 pages total).
Z. Murez et al., "Atlas: End-to-End 3D Scene Reconstruction from Posed Images", arXiv:2003.10432v3 [cs.CV], Oct. 14, 2020, (18 pages total).
Y. Nie et al., "Total3DUnderstanding: Joint Layout, Object Pose and Mesh Reconstruction for Indoor Scenes from a Single Image", In Proceedings of the IEEE/CVF Conference on Computer Vision and Pattern Recognition, pp. 55-64, 2020, (10 total pages).
C. Qi et al., "Frustum PointNets for 3D Object Detection from RGB-D Data", In Proceedings of the IEEE on Computer Vision and Pattern Recognition, pp. 918-927, 2018, (10 pages total).
C. Qi et al., "ImVoteNet: Boosting 3D Object Detection in Point Clouds with Image Votes", In Proceedings of the IEEE/CVF conference on computer vision and pattern recognition, pp. 4404-4413, 2020, (10 pages total).
Z. Qin et al., "MonoGRNet: A Geometric Reasoning Network for Monocular 3D Object Localization", In Proceedings of the AAAI Conference on Artificial Intelligence, vol. 33, pp. 8851-8858, 2019, (8 total pages).
T. Roddick et al., "Orthographic Feature Transform for Monocular 3D Object Detection", arXiv:1811.08188v1 [cs.CV], Nov. 20, 2018, (10 pages total).
A. Simonelli et al., "Disentangling Monocular 3D Object Detection", arXiv:1905.12365v1 [cs.CV], May 29, 2019, (15 total pages).
V. A. Sindagi et al., "MVX-Net: Multimodal VoxelNet for 3D Object Detection", In 2019 International Conference on Robotics and Automation (ICRA), pp. 7276-7282, IEEE, arXiv:1904.01649v1 [cs.CV], Apr. 2, 2019, (7 pages total).
S. Song et al., "SUN RGB-D: A RGB-D Scene Understanding Benchmark Suite", In Proceedings of the IEEE Conference on Computer Vision and Pattern Recognition, pp. 567-576, 2015, (10 pages total).
Z. Tian et al., "FCOS: Fully Convolutional One-Stage Object Detection", In Proceedings of the IEEE/CVF International Conference on Computer Vision, pp. 9627-9636, 2019, (10 pages total).
Y. Yan et al., "SECOND: Sparsely Embedded Convolutional Detection", Sensors, 18, 3337, doi.10.3390/s18103337, www.mdpi.com/journal/sensors, 2018, (17 pages total).
Z. Zhang et al., "H3DNet: 3D Object Detection Using Hybrid Geometric Primitives", In European Conference on Computer Vision, pp. 311-329, arXiv:2006.05682v3 [cs.CV], Jul. 23, 2020, (30 pages total).
D. Zhou et al., "IoU Loss for 2D/3D Object Detection", In 2019 International Conference on 3D Vision (3DV), pp. 85-94, IEEE, arXiv:1908.03851v1 [cs.CV], Aug. 11, 2019, (10 pages total).
Y. Zhou et al., "VoxelNet: End-to-End Learning for Point Cloud Based 3D Object Detection", In Proceedings of the IEEE Conference on Computer Vision and Pattern Recognition, pp. 4490-4499, 2018, (10 pages total).

* cited by examiner

METHOD AND ELECTRONIC DEVICE FOR 3D OBJECT DETECTION USING NEURAL NETWORKS

CROSS-REFERENCE TO RELATED APPLICATION

This application is a bypass continuation of International Application No. PCT/KR2022/007472 designating the United States, filed on May 26, 2022, in the Korean Intellectual Property Receiving Office and claims priority from Russian Patent Application No. 2021114905, filed on May 26, 2021, and Russian Patent Application No. 2021128885, filed on Oct. 4, 2021, the disclosures of which are incorporated by reference herein in their entireties.

BACKGROUND

1. Field

The disclosure relates to computer vision technologies. More particularly, the disclosure relates to methods and electronic devices for three-dimensional (3D) object detection and scene understanding implemented via neural networks.

2. Description of the Related Art

RGB (red, green, blue) images are an affordable and universal data source. Therefore, research in RGB-based 3D object detection techniques have been actively conducted in recent years. Monocular RGB images provide visual clues about the scene and its objects, yet they do not contain explicit information about the scene geometry and the absolute scale of the data. Consequently, the ability to accurately and reliably detect 3D objects in such images is extremely useful for a number of applications. Given a monocular image, deep learning-based 3D object detection methods can only deduce the scale of the data. Nevertheless, the scene geometry cannot be unambiguously derived from the RGB images since some areas may not be visible. However, use of several posed images may help obtain more information about the scene than a monocular RGB image. Accordingly, some related art 3D object detection methods run multi-view inference. These methods running run multi-view inference obtain predictions on each monocular RGB image independently, then aggregate these predictions.

Generally, the related art RGB-based 3D object detection methods are designed to be either indoor or outdoor and work under certain assumptions about the scene and the objects. For instance, outdoor methods are typically evaluated on vehicles. In general, vehicles of a single category are of similar size, they are located on the ground, and their projections onto the Bird's Eye View (BEV) do not intersect in normal, non-emergency conditions. Accordingly, a BEV-plane projection contains much information on the 3D location of a vehicle. Thus, the task of outdoors-applied 3D object detection in a point cloud may be advantageously reduced to the task of 2D object detection in the BEV plane. At the same time, indoor objects might have different heights and be randomly located in space, so their projections onto the floor plane provide little information about their 3D positions. Overall, the design of RGB-based 3D object detection methods tends to be domain-specific. Due to the above, importantly, it is common for object detection networks used in the related art methods to have a complex and hardly developed structure, because such networks may have neural architectures of the most challenging type to build, debug and use.

SUMMARY

One or more embodiments may address at least the above issues and/or issues not described above. Also, the exemplary embodiments are not required to address the issues described above, and an exemplary embodiment may not address any issue described above. For instance, one or more embodiments may solve or at least mitigate the problems encountered in related art technical solutions for detecting objects in a scene or for understanding a scene based on at least one monocular image. Thus, in contrast to the related art methods, in the apparatus, the method and the system of the disclosure, multi-view inputs are readily available and easily obtainable for both training and inference stages (e.g. by a digital camera of an electronic device). Thus, the multi-view inputs are used not only for inference but also for training. During both training and inference, the apparatus, the method and the system of the disclosure may accept posed multi-view inputs with an arbitrary number of views, which might be unique for each multi-view input. Here posed inputs/images may mean that each RGB image has a corresponding known camera pose. Moreover, the apparatus, the method and the system of the disclosure may accept posed monocular inputs (treated as a special case of multi-view inputs. Furthermore, the apparatus, the method and the system of the disclosure may work well on pure monocular (i.e. the case of inference based on a single monocular RGB image) benchmarks.

To accumulate information from multiple inputs, the apparatus, the method and the system may construct a voxel representation of the 3D space. Such a unified approach (via constructed voxel representation of the 3D space) is may be used to detect objects in both indoor and outdoor scenes as well as, at least partly, to understand a scene. Scene understanding is considered herein a sub-task of the main task of object detection. As such, depending on whether there is an indoor scene or an outdoor scene, or whether it is necessary to perform scene understanding, the method may be configured to select and apply (possibly based on one or more criterion) a corresponding head in the main neural network without changing the meta-architecture of the main neural network. Here, the term 'head' may mean one or more last convolutional layers applied in the main neural network and the term 'meta-architecture' may mean at least obtaining one or more images, extracting 2D feature maps from the images (using 2D CNN), projecting the 2D feature maps into the 3D space, and aggregating features in 3D feature map(s). Examples of heads as will be described below in detail include, but without the limitation, an outdoor object detecting part, an indoor object detecting part, and a scene understanding part. Other point cloud-based based heads known from the related art may well be used in the disclosure due to the proposed meta-architecture of the main neural network.

In the apparatus, the method and the system of the disclosure, final predictions are obtained from 3D feature maps or its 2D representations (in the outdoor-related embodiment of the method), which corresponds to the formulation of the point cloud-based detection problem. Accordingly, as briefly mentioned above, it is possible use off-the-shelf necks and heads from point cloud-based object detectors with no modifications. Deep learning models of 2D/3D object detection can be typically split into 3 blocks:

backbone, neck and head. If this is the case, «backbone» means any neural network or at least one or more layers of the neural network that is responsible for feature extraction, «neck» means any neural network or at least one or more layers of the neural network that is responsible for feature refinement (like 2D to 2D in the proposed 2D CNN or 3D to 3D in the proposed 3D CNN. «Head» means any final neural network or at least one or more final layers of the neural network for, for example, object boxes (location, size) and categories (e.g. a chair, a table, a vehicle and so on) estimation.

One or more embodiments of the disclosure may have the following non-limiting features: (1) the apparatus, the method and the system of the disclosure may use end-to-end training for multi-view object detection based on posed RGB images only; which significantly simplifies the collection of training data as only readily obtainable/available conventional monocular RGB images are required for training; (2) the apparatus, the method and the system of the disclosure may use novel fully convolutional object detection neural network that works in both monocular and multi-view settings, thus the versatility of the network is improved; (3) the apparatus, the method and the system of the disclosure may use the object detection/object detection neural network with modular designs, thus different domain-specific heads and necks may be used without changing the meta-architecture of the main network; constructing the pipeline out of building blocks helps develop a reliable yet efficient solution; and (4) finally, accuracy of object detection by the proposed technical solutions is superior to all related art technical solutions using neural network architectures trained on the training datasets (ScanNet, SUN RGB-D, KITTI, and nuScenes) most commonly used for object detection.

According to an aspect of the disclosure, there is provided a method of three-dimensional (3D) object detection using an object detection neural network including a two-dimensional (2D) feature extracting part, a 3D feature extracting part, and an outdoor object detecting part including parallel 2D convolutional layers for classification and location, which are pre-trained in end-to-end manner based on posed monocular images, the method including: receiving one or more monocular images; extracting 2D feature maps from each one of the one or more monocular images by passing the one or more monocular images through the 2D feature extracting part of the object detection neural network, generating an averaged 3D voxel volume based on the 2D feature maps, extracting a 2D representation of 3D feature maps from the averaged 3D voxel volume by passing the averaged 3D voxel volume through an encoder of the 3D feature extracting part of the object detection neural network, and performing 3D object detection as 2D object detection in a Bird's Eye View (BEV) plane, the 2D object detection in the BEV plane being performed by passing the 2D representation of 3D feature maps through the outdoor object detecting part of the object detection neural network.

The method may be performed by an electronic device of a vehicle including at least one camera configured to detect one or more 3D objects in a surrounding area of the vehicle.

The method may further include, for each image of the one or more monocular images, aggregating features in the 2D feature maps corresponding to the respective image via a Feature Pyramid Network (FPN).

The generating the averaged 3D voxel volume further includes: for each image of the one or more monocular images, generating a 3D voxel volume corresponding to the respective image using a pinhole camera model that determines a correspondence between 2D coordinates in the corresponding 2D feature maps and 3D coordinates in the 3D voxel volume; for each of the 3D voxel volume, defining a binary mask corresponding to the respective 3D voxel volume, wherein the binary mask indicates, for each voxel in the 3D voxel volume, whether the respective voxel is inside a camera frustrum of the corresponding image; for each of the 3D voxel volume, the corresponding binary mask, and the corresponding 2D feature maps, projecting features of the 2D feature maps for each of the voxel inside in the 3D voxel volume as defined by the binary mask; producing an aggregated binary mask by aggregating the binary masks defined for the 3D voxel volumes of all of the one or more monocular images; and generating the averaged 3D voxel volume by averaging the features projected in the 3D voxel volumes of all of the one or more monocular images for each of the voxel inside in the 3D voxel volume in the averaged 3D voxel volume as defined by the aggregated binary mask.

The object detection neural network may be trained on one or more outdoor training datasets by optimizing a total outdoor loss function based at least on a location loss, a focal loss for classification, and a cross-entropy loss for direction.

According to an aspect of the disclosure, there is provided a method of three-dimensional (3D) object detection using an object detection neural network including a two-dimensional (2D) feature extracting part, a 3D feature extracting part, and an indoor object detecting part including 3D convolutional layers for classification, centerness, and location, which are pre-trained in end-to-end manner based on posed monocular images, the method including: receiving one or more monocular images, extracting 2D feature maps from each one of the one or more monocular images by passing the one or more monocular images through the 2D feature extracting part of the object detection neural network, generating an averaged 3D voxel volume based on the 2D feature maps, extracting refined 3D feature maps from the averaged 3D voxel volume by passing the averaged 3D voxel volume through the 3D feature extracting part of the object detection neural network, and performing 3D object detection by passing the refined 3D feature maps through the indoor object detecting part of the object detection neural network using dense voxel representation of intermediate features.

The method may be performed by an electronic device including at least one camera configured to detect one or more 3D objects in a surrounding area of the electronic device, and the electronic may be is one of a smartphone, a tablet, smart glasses, or a mobile robot.

The method may further include, for each image of the one or more monocular images, aggregating features in the 2D feature maps corresponding to the image via a Feature Pyramid Network (FPN).

The generating the averaged 3D voxel volume may further include: for each image of the one or more monocular images, generating a 3D voxel volume corresponding to the respective image using a pinhole camera model that determines a correspondence between 2D coordinates in the corresponding 2D feature maps and 3D coordinates in the 3D voxel volume; for each of the 3D voxel volume, defining a binary mask corresponding to the respective 3D voxel volume, wherein the binary mask indicates, for each voxel in the 3D voxel volume, whether the respective voxel is inside a camera frustrum of the corresponding image; for each of the 3D voxel volume, the corresponding binary mask, and the corresponding 2D feature maps, projecting features of the 2D feature maps for each of the voxel inside in the 3D voxel volume as defined by the binary mask; producing an aggregated binary mask by aggregating the binary masks defined for the 3D voxel volumes of all of the one or more monocular images; and generating the averaged 3D voxel volume by averaging the features projected in the 3D voxel volumes of all of the one or more monocular images for each of the voxel inside in the 3D voxel volume in the averaged 3D voxel volume as defined by the aggregated binary mask.

The object detection neural network may be trained on one or more indoor training datasets by optimizing a total indoor loss function based on at least one of a focal loss for classification, a cross-entropy loss for centerness, or an Intersection-over-Union (IoU) loss for location.

The object detection neural network may further include a scene understanding part, which is pre-trained in end-to-end manner, the method may further include: performing global average pooling of the extracted 2D feature maps to obtain a tensor representing the extracted 2D feature maps, and estimating a scene layout by passing the tensor through the scene understanding part configured to jointly estimate camera rotation and 3D layout of the scene, and the scene understanding part may include two parallel branches: two fully connected layers that output 3D scene layout and two fully other connected layers that estimate camera rotation.

The method may be performed by an electronic device including at least one camera configured to understand a scene in a surrounding area of the electronic device, and the electronic device is one of a smartphone, a tablet, smart glasses, or a mobile robot.

The scene understanding part of the object detection neural network may be trained on one or more indoor training datasets by optimizing the total scene understanding loss function based on at least one of a layout loss or a camera rotation estimation loss.

According to an aspect of the disclosure, there is provided an electronic device mounted on a vehicle including at least one camera, and configured to use an object detection neural network including a two-dimensional 2D feature extracting part, a 3D feature extracting part, and an outdoor object detecting part including parallel 2D convolutional layers for classification and location, which are pre-trained in end-to-end manner based on posed monocular images, the electronic device including: a memory storing one or more instructions; and a processor configured to execute the one or more instructions to: receive one or more monocular images; extract 2D feature maps from each one of the one or more monocular images by passing the one or more monocular images through the 2D feature extracting part of the object detection neural network, generate an averaged 3D voxel volume based on the 2D feature maps, extract a 2D representation of 3D feature maps from the averaged 3D voxel volume by passing the averaged 3D voxel volume through an encoder of the 3D feature extracting part of the object detection neural network, perform 3D object detection as 2D object detection in a Bird's Eye View (BEV) plane, the 2D object detection in the BEV plane being performed by passing the 2D representation of 3D feature maps through the outdoor object detecting part of the object detection neural network; and detect one or more 3D objects in a surrounding area of the vehicle based on 3D object detection.

According to an aspect of the disclosure, there is provided an electronic device including at least one camera, and configured to use an object detection neural network including a two-dimensional (2D) feature extracting part, a 3D feature extracting part, and an indoor object detecting part including 3D convolutional layers for classification, centerness, and location, which are pre-trained in end-to-end manner based on posed monocular images, the electronic device including: a memory storing one or more instructions; and a processor configured to execute the one or more instructions to: receive one or more monocular images, extract 2D feature maps from each one of the one or more monocular images by passing the one or more monocular images through the 2D feature extracting part of the object detection neural network, generate an averaged 3D voxel volume based on the 2D feature maps, extract refined 3D feature maps from the averaged 3D voxel volume by passing the averaged 3D voxel volume through the 3D feature extracting part of the object detection neural network, perform 3D object detection by passing the refined 3D feature maps through the indoor object detecting part of the object detection neural network using dense voxel representation of intermediate features; and detect one or more 3D objects in a surrounding area of the electronic device based on the 3D object detection.

The electronic device is one of a smartphone, a tablet, smart glasses, or a mobile robot.

According to an aspect of the disclosure, there is provided a computer readable medium storing computer executable instructions that when executed by a processor cause the processor to perform a method of three-dimensional (3D) object detection using an object detection neural network including a two-dimensional 2D feature extracting part, a 3D feature extracting part, and an outdoor object detecting part including parallel 2D convolutional layers for classification and location, which are pre-trained in end-to-end manner based on posed monocular images, the method including: receiving one or more monocular images; extracting 2D feature maps from each one of the one or more monocular images by passing the one or more monocular images through the 2D feature extracting part of the object detection neural network, generating an averaged 3D voxel volume based on the 2D feature maps, extracting a 2D representation of 3D feature maps from the averaged 3D voxel volume by passing the averaged 3D voxel volume through an encoder of the 3D feature extracting part of the object detection neural network, and performing 3D object detection as 2D object detection in a Bird's Eye View (BEV) plane, the 2D object detection in the BEV plane being performed by passing the 2D representation of 3D feature maps through the outdoor object detecting part of the object detection neural network.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Reference will now be made in detail to embodiments which are illustrated in the accompanying drawings, wherein like reference numerals refer to the like elements throughout. Exemplary embodiments are described below in order to explain the present disclosure by referring to the figures.

The following structural or functional descriptions are merely exemplary to, and the scope of the exemplary embodiments is not limited to the descriptions provided in the present specification. Various changes and modifications can be made thereto by those of ordinary skill in the art.

According to one or more embodiments of the disclosure, an apparatus may receive or obtain an arbitrary-sized set of monocular images along with camera poses for such images. Camera poses may be estimated based on images by any technique known in the related art. For example, the camera poses may be estimated based on MVS (Multi-View Stereo), SLAM (Simultaneous Localization And Mapping), camera tracking and so on. Alternatively, estimated camera poses associated with respective images of the set of monocular images may be received or otherwise obtained as additional information in any appropriate form. The set of images may include one or more images. Images in the set may be, but without the limitation, RGB images or any other color images.

According to one or more embodiments of the disclosure, the apparatus may extract features (e.g. in the form of 2D feature maps) from the one or more images using 2D feature extracting part of a main object detection neural network. According to an embodiment, any 2D convolutional backbone, such as, VGGNet, ResNet, ResNet-50, MobileNet or other CNNs may be used as the 2D feature extracting part. The extracted image features may then projected to a 3D voxel volume. For each voxel, the projected features from several images are aggregated. According to an embodiment, the projected features from several images may be aggregated via a simple element-wise averaging. However, the disclosure is not limited thereto, and as such, other techniques may be used to aggregate the several images. Next, the voxel volume with the projected and aggregated features is passed to a 3D feature extracting part of the main object detection neural network. The 3D feature extracting part may be a 3D convolutional network referred to as neck. The outputs (e.g. in the form of 3D feature maps) of the 3D feature extracting part serve as inputs to an object detecting part of the main object detection neural network. According to an embodiment, the object detecting part may be, the last few convolutional layers referred to as head in the main object detection neural network. The object detecting part is trained to perform object detection. For example, the object detecting part may perform object detection by predicting bounding box features for each anchor. An anchor represents one or more location candidates in 3D space possibly with additional priors like mean object size or its aspect ratio. The resulting bounding boxes of the detected objects may be parameterized as (x, y, z, w, h, l, θ), where (x; y; z) are the coordinates of the center of the bounding box; w, h, l respectively are width, height, and length, and θ is the rotation angle around z-axis.

Figure 1:
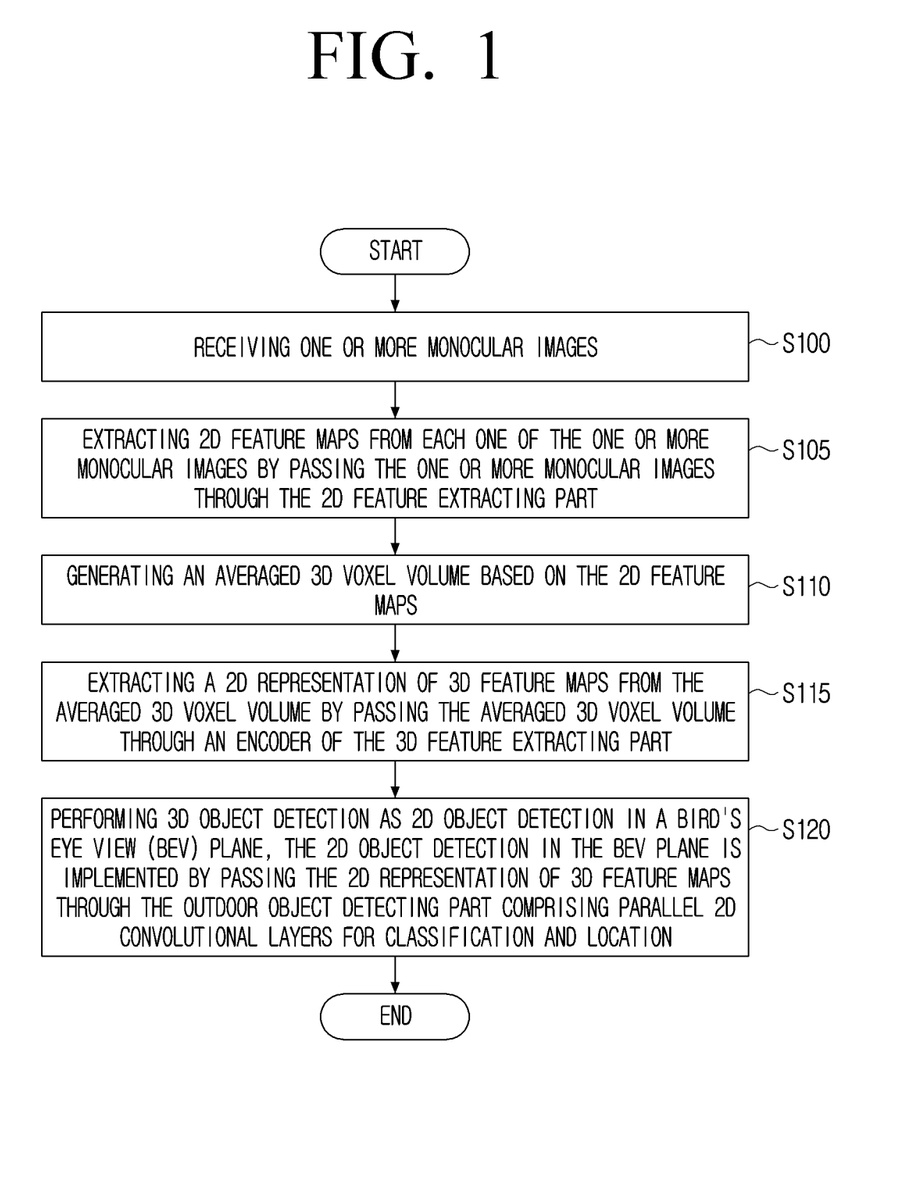
FIG. 1 illustrates a flowchart of a method of 3D object detection using a pretrained object detection neural network having an outdoor object detecting part according to a first embodiment of the disclosure.

Hereinafter, a more detailed description of the method according to a first embodiment of the disclosure is provided with references to FIGS. 1 and 2. In FIG. 1, a flowchart of a method of 3D object detection using a pretrained object detection neural network (also referred to as the main neural network) having an outdoor object detecting part according to an embodiment of the disclosure is illustrated. According to an embodiment, in operation S100, the method includes receiving one or more monocular images. According to an embodiment, the one or more monocular images may be RGB images or any other color images in one of different formats. The one or more monocular images may be represented as follows: Let $I_t \in R^{W \times H \times 3}$ be the t-th image in the set of T images. Here, T>1 in case of multi-view inputs and T=1 for single-view inputs.

Figure 2:
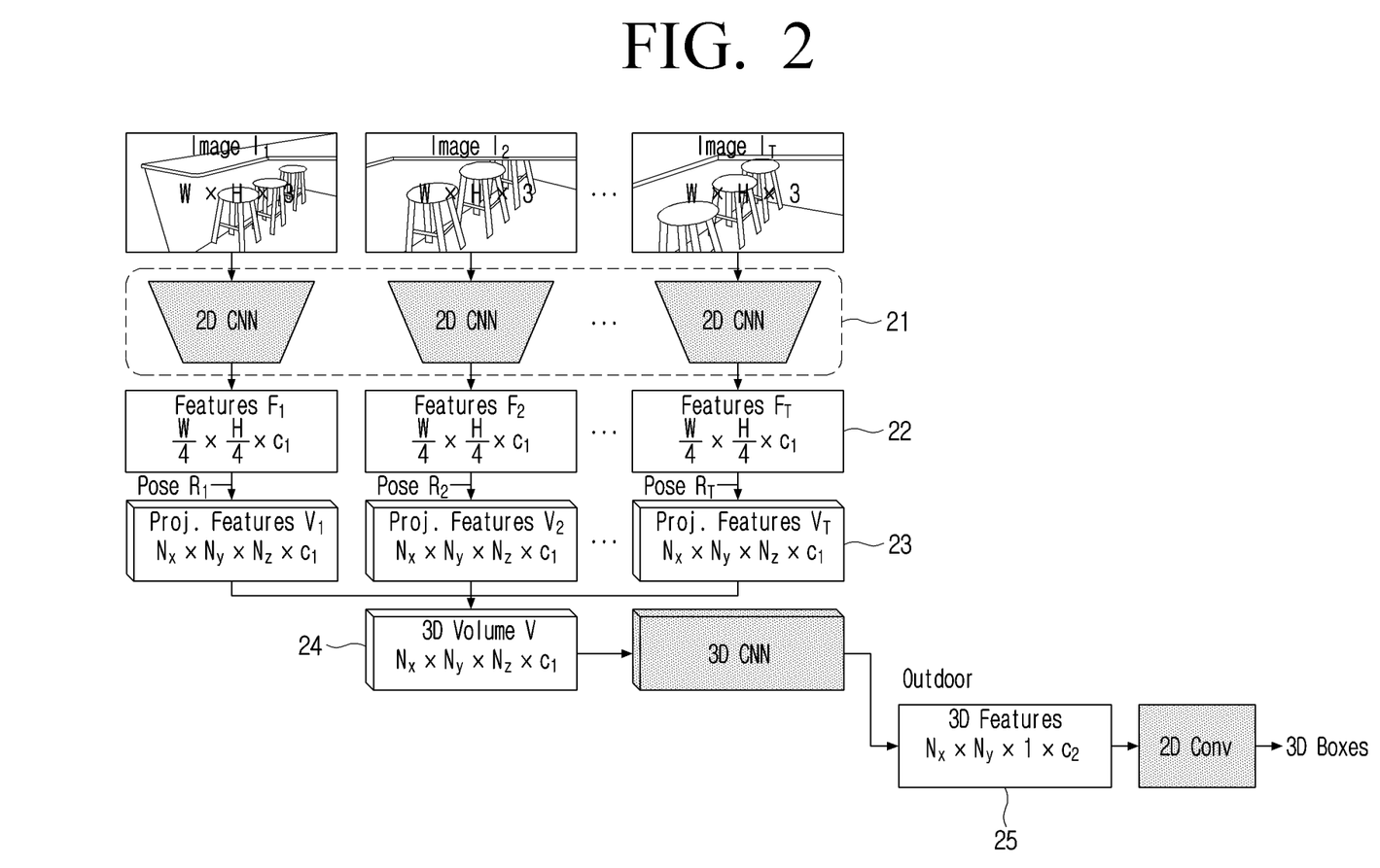
FIG. 2 illustrates a schematic representation of particular architectural portions of the pretrained object detection neural network and operations of the method of 3D object detection according to the first embodiment of the disclosure.

In operation S105, 2D feature maps are extracted from each one of the one or more monocular images by passing the one or more monocular images through a 2D feature extracting part (2D CNN) illustrated in 21 of FIG. 2. According to an embodiment, the 2D feature extracting part may output four 2D feature maps of shapes $$\frac{W}{4} \times \frac{H}{4} \times c_0, \frac{W}{8} \times \frac{H}{8} \times 2c_0, \frac{W}{16} \times \frac{H}{16} \times 4c_0, \text{ and } \frac{W}{32} \times \frac{H}{32} \times 8c_0.$$

However, the disclosure is not limited thereto, and the particular number of 2D feature maps output by the 2D feature extracting part may not be limited to four. As such, according to another embodiment, different number of 2D feature maps and different shapes of 2D feature maps are possible as well. For instance, only three or only two of the 2D feature maps may be output and used subsequently according to another embodiment.

According to an embodiment, features in the obtained 2D features maps may then be aggregated. According to an embodiment, the features may be aggregated via a Feature Pyramid Network (FPN), which outputs one tensor $F_t$ of shape $$\frac{W}{4} \times \frac{H}{4} \times c_1.$$

According to an embodiment $c_0$ and $c_1$ may be backbone-specific. According to an embodiment, the particular values of $c_0$ and $c_1$ may be 64. The feature maps $F_1$ to $F_T$ having aggregated features are illustrated in 22 of FIG. 2 for corresponding input images $I_1$ to $I_T$.

According to an embodiment, in operation S110, the method includes generating an averaged 3D voxel volume based on the 2D feature maps. For t-th input, the extracted 2D feature map $F_t$ is then projected into a 3D voxel volume $V_t \in R^{N_x \times N_y \times N_z \times c_1}$ as illustrated in 23 of FIG. 2. According to an embodiment, z-axis may be set to be perpendicular to the floor plane, x-axis may be set to point forward and y-axis maybe set to be orthogonal to both x-axis and z-axis. For each dataset, there are known spatial limits estimated empirically for all three axes. Let us denote these limits as $x_{min}$, $x_{max}$, $y_{min}$, $y_{max}$, $z_{min}$, $z_{max}$. For a fixed voxel size s, spatial constraints can be formulated as $N_x s = x_{max} - x_{min}$, $N_y s = y_{max} - y_{min}$, $N_z s = z_{max} - z_{min}$. Next, a pinhole camera model may be used, but without the limitation, to determine the correspondence between 2D coordinates (u, v) in 2D feature map $F_t$ and 3D coordinates (x, y, z) in volume $V_t$:

$$\begin{bmatrix} u \\ v \end{bmatrix} = \prod \begin{bmatrix} \frac{1}{4} & 0 & 0 \\ 0 & \frac{1}{4} & 0 \\ 0 & 0 & 1 \end{bmatrix} KR_t \begin{bmatrix} x \\ y \\ z \\ 1 \end{bmatrix},$$

K and $R_t$ are respectively the intrinsic and extrinsic camera matrices, and $\Pi$ is a perspective mapping. Intrinsic parameters of the intrinsic camera matrix define the location and orientation of the camera with respect to the world frame. Extrinsic parameters of the extrinsic camera matrix allow a mapping between camera coordinates and pixel coordinates in the image frame. According to an embodiment, $R_t$ may be a pose information. Particular values of intrinsic and extrinsic parameters may be predetermined for a camera as the result of calibration process of the camera. According to an embodiment, the data set may be ScanNet, SUN RGB-D, KITTI, and nuScenes, but the disclosure is not limited thereto.

After projecting 2D feature maps, all voxels along a camera ray get filled with the same features of the corresponding 2D feature map(s). Binary mask $M_t$ may be optionally defined. A shape of the binary mask $M_t$ may correspond to the shape of the volume $V_t$. The binary mask indicates whether each voxel is inside the camera frustrum, i.e. whether the voxel is the «inside voxel» or not. Thus, for each image $I_t$, the mask $M_t$ may be defined as:

$$M_t(x, y, z) = \begin{cases} 1, \text{ if } 0 \leq u < \frac{W}{4} \wedge 0 \leq v < \frac{H}{4} \\ 0, \text{ otherwise} \end{cases}$$

Then, 2D feature map $F_t$ is projected for each inside (i.e. valid) voxel in the volume $V_t$:

$$V_t(x, y, z) = \begin{cases} F_t(u, v), \text{ if } M_t(x, y, z) = 1 \\ 0, \text{ otherwise} \end{cases}$$

Inside volumes $V_1$ to $V_T$ with the projected features corresponding to feature maps $F_1$ to $F_T$ having aggregated features are illustrated in 24 of FIG. 2 for corresponding input images $I_1$ to $I_T$.

The aggregated binary mask M is a sum of $M_1, \ldots, M_t$:

$$M(x, y, z) = \begin{cases} \sum_t M_t(x, y, z), \text{ if } \sum_t M_t(x, y, z) > 0 \\ 1, \text{ otherwise} \end{cases}$$

Finally, the averaged 3D voxel volume V is generated by averaging the projected features in volumes $V_1, \ldots, V_t$ across inside voxels:

$$V = \frac{1}{M} \sum_t M_t V_t$$

The averaged 3D voxel volume V of shape $N_x \times N_y \times N_z \times c_t$ generated based on inside volumes $V_1$ to $V_T$ with the projected features corresponding to feature maps $F_1$ to $F_T$ having aggregated features is illustrated in 24 of FIG. 2 for corresponding input images $I_1$ to $I_T$.

According to an embodiment, since the outdoor object detecting part accepts 2D feature maps, it is necessary to obtain a 2D representation of the generated 3D voxel volume. Thus, returning to FIG. 1, once the averaged 3D voxel volume V is generated, the method proceeds to operation S115 of extracting a 2D representation of 3D feature maps from the averaged 3D voxel volume. According to an embodiment, operation S115 include passing the averaged 3D voxel volume through an encoder of the 3D feature extracting part (3D CNN) illustrated in FIG. 2». The 3D feature extracting part 3D CNN may correspond to the encoder-decoder architecture.

After passing through several 3D convolutional and downsampling layers of the encoder of the 3D feature extracting part, the averaged 3D voxel volume V of shape $N_x \times N_y \times N_z \times c_1$ is mapped to the tensor of shape $N_x \times N_y \times c_2$ being 2D representation of 3D feature maps of the averaged 3D voxel volume. The obtained tensor of shape $N_x \times N_y \times c_2$ is the output 25 (in FIG. 2) of the 3D feature extracting part. By performing operation S115, it is possible to reduce the task of 3D object detection in 3D space to the task of 2D object detection in the BEV plane. Both the 3D feature extracting part 3D CNN illustrated on FIG. 2 and the outdoor object detecting part 2D Conv illustrated on FIG. 2 include 2D convolutions.

Finally, once the tensor of shape $N_x \times N_y \times c_2$ being the representation of the averaged 3D voxel volume V in the BEV plane is obtained, the method proceeds operation S120 of performing 3D object detection in the form of 2D object detection in the BEV plane. The 2D object detection in the BEV plane is implemented by passing the 2D representation of 3D feature maps through the outdoor object detecting part 2D Conv including parallel 2D convolutional layers for classification and location. According to an embodiment, parallel with respect to layers means that outputs of the penultimate convolutional layer are fed to 2 final layers (one for classification, the other one for location), which are independent of each other. For instance, according to an embodiment, processing in the layers may be performed simultaneously. Thus, the outdoor 3D object detection task is reformulated in the method according to an embodiment as 2D object detection task in the BEV plane.

According to an example, embodiment, a 2D anchor head may be used. For example, the object detecting part may perform object detection by predicting bounding box features for each anchor. An anchor represents one or more location candidates in 3D space possibly with additional priors like mean object size or its aspect ratio. According to an embodiment, fast encoders for object detection from point clouds may be used. According to an embodiment, KITTI and nuScenes datasets may be used, but the disclosure is not limited thereto, and as such, other point cloud-based head may be used with the main object detection neural network.

According to an embodiment, since outdoor 3D detection methods are commonly evaluated on vehicles or other objects presenting on or near a road (e.g. pedestrians, objects of road infrastructure such as road markings and road signs), all such objects are of a similar predetermined scale and belong to fixed categories. For single-scale and single-class detection, the outdoor object detecting part comprises two parallel 2D convolutional layers. One layer estimates class probability, while the other regresses seven parameters of the bounding box of an object, if detected.

Input to the outdoor object detecting part. The input, as already briefly mentioned above, is the tensor of shape $N_x \times N_y \times c_2$. Particular value of $c_2$ is predetermined and will be exemplified below.

Output of the outdoor object detecting part. For each 2D BEV anchor, the outdoor object detecting part returns a class probability p and a 3D bounding box, e.g. as the following 7-tuple:

$$\Delta x = \frac{x^{gt} - x^a}{d^a}, \Delta y = \frac{y^{gt} - y^a}{d^a}, \Delta z = \frac{z^{gt} - z^a}{d^a},$$

$$\Delta w = \log \frac{w^{gt}}{w^a}, \Delta l = \log \frac{l^{gt}}{l^a}, \Delta h = \log \frac{h^{gt}}{h^a}, \Delta \theta = \sin(\theta^{gt} - \theta^a).$$

Here $\cdot^{gt}$ and $\cdot^a$ respectively are the ground truth and anchor boxes. The length of the bounding box diagonal $d^a = \sqrt{(w^a)^2 + (l^a)^2}$ is constant for all anchors since they are located in the BEV plane and computed for a single class of objects (e.g. cars).

Loss. To train the outdoor object detecting part the following loss function may be used, but without the limitation. The total outdoor loss may comprise several loss terms, namely smooth mean absolute error as a location loss $L_{loc}$, focal loss for classification $L_{cls}$, and cross-entropy loss for direction $L_{dir}$. Overall, total outdoor loss may be formulated, for example, as follows:

$$L_{outdoor} = \frac{1}{n_{pos}} (\lambda_{loc} L_{loc} + \lambda_{cls} L_{cls} + \lambda_{dir} L_{dir}),$$

$n_{pos}$ is the number of positive anchors; an anchor is considered positive if at least one ground truth object corresponds to the anchor. $\lambda_{loc}=2$, $\lambda_{cls}=1$, $\lambda_{dir}=0.2$, but not limited to the specified values.

As described above with references to FIG. 1 and FIG. 2, the main object detection neural network used in the method of 3D object detection according to the first embodiment of the disclosure constructs a 3D voxel representation of the space. Thus, it can use a head or a neck from any one of the known point cloud-based 3D object detection methods. Therefore, instead of time-consuming custom and complex architecture implementation, one can employ state-of-the-art heads with corresponding methods and without further modifications. Thus, the modular design of the object detection neural network used in the method of object detection according to the first embodiment of the disclosure achieves improved flexibility and simplifies development process. However, it should be appreciated that designs of heads significantly differ for outdoor and indoor methods.

The method embodiment described with references to FIG. 1 and FIG. 2 is adapted for outdoors and may be executed by an electronic device of a vehicle equipped with at least one camera to detect one or more 3D objects in a surrounding area of the vehicle. Such an electronic device may be the vehicle autonomous driving system or at least part thereof. Such a system may comprise at least one or more cameras mounted on the vehicle and configured to capture images of vehicle surroundings around the vehicle and a processor configured to execute or trigger different vehicle-related operations. It should be appreciated that the invention disclosed in the present application does not claim to be the autonomous driving technical solution as such, but it can be a part of such a technical solution for the vehicle, the part responsible for 3D object detection.

Figure 3:
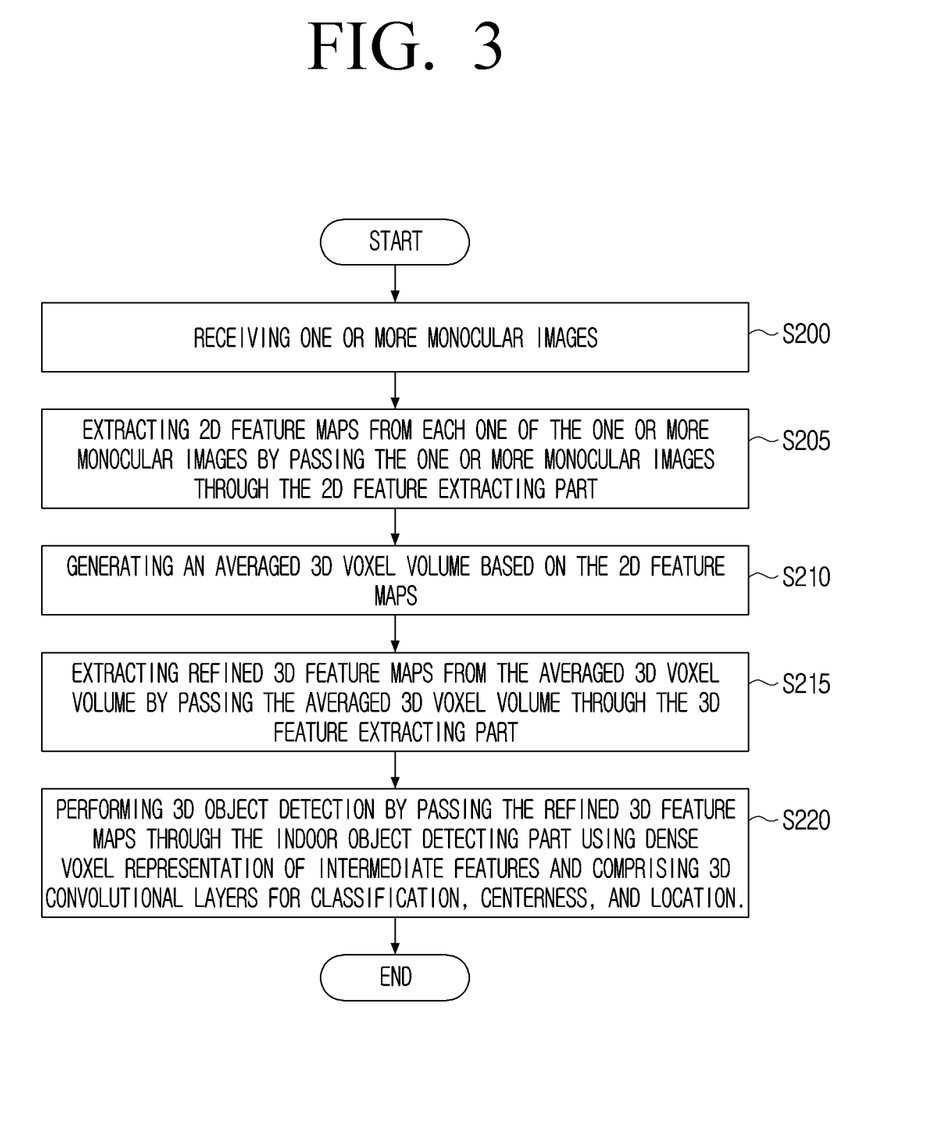
FIG. 3 illustrates a flowchart of a method of 3D object detection using a pretrained object detection neural network having an indoor object detecting part according to a second embodiment of the disclosure.
Figure 4:
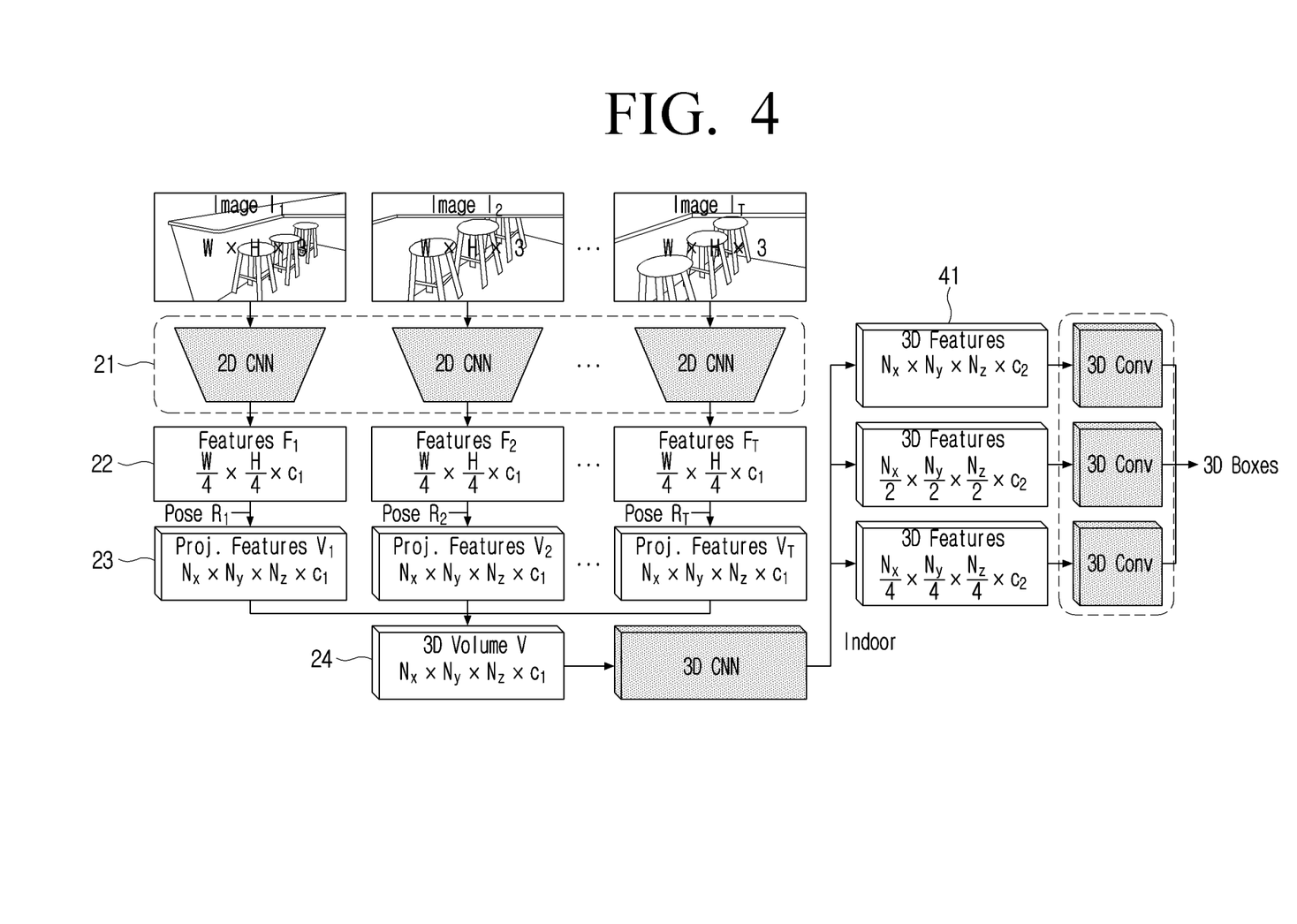
FIG. 4 illustrates a schematic representation of particular architectural portions of the pretrained object detection neural network and operations of the method of 3D object detection according to the second embodiment of the disclosure.

FIGS. 3 and 4 illustrate a method of 3D object detection according to a second embodiment of the disclosure. A flowchart of a method of 3D object detection using a pretrained object detection neural network having an indoor object detecting part according to the second embodiment of the disclosure is illustrated on FIG. 3. Since operations S200, S205, S210 of the method illustrated in FIG. 3 correspond to the operations S100, S105, S110 of the method illustrated in FIG. 1, repeated descriptions of operations S200, S205, S210 will be omitted for brevity. Furthermore, since the meta-architecture (i.e. 2D CNNs, 3D CNN plus additional operations between them as illustrated on FIG. 2 and FIG. 4) of the main object detection neural network in both embodiments of the method proposed and disclosed herein remains the same, repeated description of the meta-architecture as illustrated on FIG. 4 will be omitted for brevity as well.

Referring now to FIG. 3 and FIG. 4, once the averaged 3D voxel volume Vis generated, in operation S215, the method includes extracting refined 3D feature maps from the averaged 3D voxel volume. According to an embodiment, if 3D features are input, the refined 3D features corresponding to the input 3D features are output. This operation S215 is performed by passing the averaged 3D voxel volume through the whole 3D convolutional encoder-decoder architecture of the 3D feature extracting part 3D CNN illustrated on FIG. 4.

Each layer of the encoder-decoder architecture used in operation S215 may include residual blocks with a predetermined number of 3D convolutional layers with a kernel of a predetermined size. According to an embodiment, the predetermined number of 3D convolutional layers is two and the predetermined size of the kernel is three. For downsampling, convolutions with a kernel of a predetermined size and a predetermined stride are applied. According to an embodiment, the predetermined size of the kernel of the downsampling-related convolutions is three and the predetermined stride is two. Upsampling may be performed, for example, via trilinear interpolation followed by convolution with a kernel of a predetermined size. In one example, the kernel size of the upsampling-related convolution is one. However, the disclosure should not be limited to the values of said parameters specified in the above examples, because other particular values of these parameters are possible and may be determined empirically based on such factors as, for example, a field of application of the proposed method and computing/hardware-related/other capabilities of a device which is supposed to carry out the proposed method. As the result of operation S215, the decoder of the 3D feature extracting part outputs refined 3D feature maps (of the following shapes:

$$\frac{N_x}{4} \times \frac{N_y}{4} \times \frac{N_z}{4} \times c_2, \frac{N_x}{2} \times \frac{N_y}{2} \times \frac{N_z}{2} \times c_2, N_x \times N_y \times N_z \times c_2.$$

According to an embodiment, the particular value of $c_2$ may be 64. As such, in an example, $c_1=c_2=64$, so as not to increase the occupied memory in the process of computing in the 3D feature extracting part. The refined 3D feature maps are illustrated in 41 of FIG. 4. However, the disclosure is not limited thereto, and as such, the particular values of $c_1$ and $c_2$ may be different.

As described above with references to FIG. 3 and FIG. 4, the main object detection neural network used in the method of 3D object detection according to the second embodiment of the disclosure also constructs a 3D voxel representation of the space. Thus, it can also use a neck or a head from any one of the known point cloud-based 3D object detection methods. Therefore, instead of time-consuming custom and complex architecture implementation, one can employ state-of-the-art necks and/or heads with corresponding methods and without further modifications. Thus, the modular design of the object detection neural network used in the method of 3D object detection according to the second embodiment of the disclosure achieves similarly to the first embodiment of the disclosure improved flexibility and simplifies development process. Nevertheless, it should be appreciated that designs of heads significantly differ for outdoor and indoor methods.

Finally, once the refined 3D feature maps are extracted, the method according to the second embodiment goes to the operation S220 of performing 3D object detection. This operation S220 may be implemented by passing the refined 3D feature maps through the indoor object detecting part that uses dense voxel representation of intermediate features and may include 3D convolutional layers for classification, centerness, and location. While indoor 3D object detection methods may perform deep Hough voting for sparse point cloud representation, according to an embodiment, the method may use dense voxel representation of intermediate features. As such, according to an embodiment, the indoor object detecting part for 3D object detection is dense, 3D, and multi-scale.

According to an embodiment, the design of the indoor object detecting part may be, for example, a 2D detection method FCOS fully convolutional one-stage object detector. According to an embodiment, an original FCOS head may accept 2D features from FPN (Featured Pyramid Network) and estimate 2D bounding boxes via 2D convolutional layers. To adapt FCOS for 3D detection, 2D convolutions of the original FCOS are replaced in the embodiments of the disclosure with 3D convolutions for the ability of the indoor object detecting part to process 3D inputs. Following FCOS, center sampling may be applied to select candidate object locations. According to an embodiment, 9 (3×3) candidates may be chosen. Number of candidates may be more or less than the specified number. Since the method operates in 3D space according to an embodiment, a limit of candidate locations per object may be set to a predetermined number (e.g. 27, 3×3×3). The resulting indoor object detecting part may include three 3D convolutional layers for classification, location, and centerness, respectively, with weights shared across all object scales.

Input to the indoor object detecting part. According to an embodiment, the multi-scale input to the indoor object detecting part may be composed, as already briefly mentioned above, of three tensors of shapes $$\frac{N_x}{4} \times \frac{N_y}{4} \times \frac{N_z}{4} \times c_2, \frac{N_x}{2} \times \frac{N_y}{2} \times \frac{N_z}{2} \times c_2, \text{ and } N_x \times N_y \times N_z \times c_2.$$

Output of the indoor object detecting part. According to an embodiment, for each 3D location $(x^a; y^a; z^a)$ and each of three scales, the head estimates a class probability p, a centerness c, and a 3D bounding box as, for example, the following 7-tuple:

$$\Delta x_{min} = x_{min}^{gt} - x^a, \Delta x_{max} = x_{max}^{gt} - x^a,$$

$$\Delta y_{min} = y_{min}^{gt} - y^a, \Delta y_{max} = y_{max}^{gt} - y^a,$$

$$\Delta z_{min} = z_{min}^{gt} - z^a, \Delta z_{max} = z_{max}^{gt} - z^a, \Theta.$$

Here, $x_{min}^{gt}, x_{max}^{gt}, y_{min}^{gt}, y_{max}^{gt}, z_{min}^{gt}, z_{max}^{gt}$ respectively denote the minimum and maximum coordinates along respective axes of a ground truth bounding box.

Loss. According to an embodiment, the loss function may be modified used for training the indoor object detecting part. The modified total loss function may include focal loss for classification $L_{cls}$, cross-entropy loss for centerness $L_{cntr}$, and Intersection-over-Union (IoU) loss for location $L_{loc}$. Since the method according to the second embodiment (for indoors) addresses 3D detection task instead of the 2D detection task, 2D IoU loss is replaced with rotated 3D IoU loss. In addition, ground truth centerness is updated with the third dimension. The resulting indoor total loss may be formulated, for example, as follows:

$$L_{indoor} = \frac{1}{n_{pos}}(L_{loc} + L_{cls} + L_{cntr}),$$

where $n_{pos}$ is the number of positive 3D locations.

According to an embodiment, the method illustrated in FIGS. 3 and 4 may be adapted for indoors and may be executed by an electronic device equipped with at least one camera to detect one or more 3D objects in a surrounding area of the electronic device. The electronic device according to second embodiment may be one of, for example, a smartphone, a tablet, smart glasses, a mobile robot. When the electronic device is the smartphone, the tablet, or the smart glasses, users can direct the cameras of such devices in different directions to detect objects encountered in fields of view of the cameras. In that case, as an example, such devices may serve as devices that help visually impaired users to navigate indoors and locate various objects, e.g. via synthesized voice prompts providing information about zero or more detected objects detected or information about their positions.

According to an embodiment, when an electronic device is the mobile robot, e.g. cleaning mobile robot, the electronic device may be the robot itself or at least part thereof. Such the electronic device may include at least one or more cameras mounted on the robot body and configured to capture images of robot surroundings around the robot and a processor configured to execute or trigger different robot-related operations. It should be appreciated that the invention disclosed in the present application does not claim to be the technical solution for navigating the robot and controlling robot movements as such, but it can be a part of such a technical solution for the robot, the part responsible for 3D object detection.

According to an embodiment, the method may be adapted for scene understanding including camera pose estimation and room layout detection. In the method according to the modification of the second embodiment, the main object detection neural network further comprises a pre-trained scene understanding part. In some indoor benchmarks, the 3D object detection task may be formulated as a sub-task of scene understanding. According to an embodiment, camera rotations and room layouts may be predicted in the present modification of the second embodiment of the method. The scene understanding part in this modification of the second embodiment of the method is trained and configured to jointly estimate camera rotation $R_t$ and 3D layout of a scene. This scene understanding part comprises two parallel branches: two fully connected layers output 3D scene layout and the other two fully connected layers estimate camera rotation.

Input to the scene understanding part. According to an embodiment, the input is a single tensor of shape $8c_0$, obtained through global average pooling of the 2D feature extracting part output.

Output from the scene understanding part. According to an embodiment, the scene understanding part outputs camera pose as, for example, a tuple of pitch $\beta$ and roll $\gamma$, and a 3D layout box (being a box approximating an indoor room), for example, as the 7-tuple (x, y, z, w, l, h, $\theta$). Yaw angle and shift may be set to zeros.

Loss. According to an embodiment, losses may be modified to make them consistent with the sub-task to be solved. Accordingly, layout loss $L_{layout}$ as rotated 3D IoU loss between predicted and ground truth layout boxes; this is the same loss as used for the indoor object detecting part according to the second embodiment. For camera rotation estimation, $L_{pose}=|\sin(\beta^{gt}-\beta)|+|\sin(\gamma^{gt}-\gamma)|$ is used substantially similarly to $L_{loc}$ in the first embodiment of the method. Overall, the total loss for training the scene understanding part can be formulated, for example as follows:

$$L_{extra}=\lambda_{layout}L_{layout}+\lambda_{pose}L_{pose},$$

where $\lambda_{layout}=0.1$ and $\lambda_{pose}=1.0$ but not limited to the specified values.

According to the second embodiment, the method described above may be adapted for indoor scene understanding and may be executed by an electronic device equipped with at least one camera to detect one or more 3D objects in a surrounding area of the electronic device, estimate a camera pose and detect a room layout. The electronic device in the second embodiment of the method may be one of, for example, a smartphone, a tablet, smart glasses, a mobile robot. When the electronic device is the smartphone, the tablet, or the smart glasses, users can direct the cameras of such devices in different directions in an indoor scene to understand scene characteristics and scene contents encountered in fields of view of the cameras. In that case, as an example, such devices may serve as devices that help visually impaired users to navigate indoors and locate various objects, e.g. via synthesized voice prompts providing information about the scene.

When an electronic device is the mobile robot, e.g. cleaning mobile robot, the electronic device may be the robot itself or at least part thereof. Such the electronic device may comprise at least one or more cameras mounted on the robot body and configured to capture images of a scene around the robot and a processor configured to execute or trigger different robot-related operations. It should be appreciated that the invention disclosed in the present application does not claim to be the technical solution for navigating the robot and controlling robot movements as such, but it can be a part of such a technical solution for the robot, the part responsible for scene understanding.

In addition, a third embodiment of the method is provided as well in which the method is adapted to automatically select a neck and/or a head depending on operating conditions or tasks at hand. As an example, if a speed of the electronic device implementing the method is above a predetermined threshold (e.g. 4 km per hour), or GPS coordinates of the electronic device implementing the method indicating to that the current position of the electronic device is the outdoor position, and/or the corresponding function is activated on the electronic device (e.g. an object detecting function in camera settings), the method may switch to the processing branch and architecture described above with reference to FIG. 1 and FIG. 2.

According to an embodiment, if a speed of the electronic device implementing the method is below a predetermined threshold (e.g. 4 km per hour), or GPS coordinates of the electronic device implementing the method indicating to that the current position of the electronic device is the indoor position, and/or the corresponding function is activated on the electronic device (e.g. an object detecting function in camera settings), the method may switch to the processing branch and architecture described above with reference to FIG. 2 and FIG. 3. Other exemplary implementations of such an automatic switching will be easily understood by skilled person in the art based on the above given examples.

The following information describes datasets that are applicable for training and evaluating the proposed the object detection neural network of the first embodiment of the method (for outdoors), the second embodiment of the method (for indoors), the modification of the second embodiment of the method (for scene understanding), or the third embodiment of the method (capable of auto-switching between processing branches and architectures or parts thereof depending on operating conditions or tasks at hand).

According to an embodiment, four datasets are used in the disclosure for training neural networks or evaluating the neural networks: ScanNet, SUN RGB-D, KITTI, and nuScenes. SUN RGB-D and KITTI are benchmarked in monocular mode, while for ScanNet and nuScenes, the detection problem is addressed in multi-view formulation.

KITTI. According to an embodiment, the KITTI object detection dataset is the most decisive outdoor benchmark for monocular 3D object detection. It includes 3711 training, 3768 validation and 7518 test images. All 3D object annotations in the dataset have a difficulty level: easy, moderate, and hard. nuScenes. According to an embodiment, the nuScenes dataset provides data for developing algorithms addressing self-driving-related tasks. It contains LiDAR point clouds, RGB images captured by six cameras, accompanied by IMU and GPS measurements. The dataset covers 1000 video sequences, each recorded for 20 seconds, totaling 1.4 million images and 390 000 point clouds. Training split covers 28 130 scenes, and validation split contains 6019 scenes. The annotation contains 1.4 million objects divided into 23 categories. The accuracy of 3D detection was measured on vehicle category. In this benchmark, not only the average precision (AP) metric but average translation error (ATE), average scale error (ASE), and average orientation error (AOE) are calculated as well.

SUN RGB-D. According to an embodiment, SUN RGB-D is one of the first and most well-known indoor 3D datasets. It contains 10 335 images captured in various indoor places alongside corresponding depth maps obtained with four different sensors and camera poses. The training split is composed of 5285 frames, while the rest 5050 frames comprise the validation subset. The annotation includes 58 657 objects. For each frame, a room layout is provided.

ScanNet. According to an embodiment, the ScanNet dataset contains 1513 scans covering over 700 unique indoor scenes, out of which 1201 scans belong to a training split, and 312 scans are used for validation. Overall, this dataset contains over 2.5 million images with corresponding depth maps and camera poses, alongside reconstructed point clouds with 3D semantic annotation. 3D bounding boxes are estimated from semantic point clouds following the standard protocol. The resulting object bounding boxes are axis-aligned, so the rotation angle $\theta$ was not predicted for ScanNet.

3D Volume. According to an embodiment, ResNet-50 may be used as the feature extractor, i.e. as the 2D feature extracting part. Accordingly, the number of convolutions in the first convolutional block $c_0$ may be predetermined as 256. The 3D volume feature size $c_1$ may be predetermined as 64. For indoor datasets, output feature size $c_2$ may be set to be equal to $c_1$ to not increase the amount of memory used during refining. For outdoor datasets $c_2$ may be set to 256.

According to an embodiment. Indoor and outdoor scenes are of different absolute scales. Therefore, the spatial sizes of the feature volume for each dataset may be set taking into consideration the data domain. Thus, for example, voxel size s may be set as 0.32 meters for outdoor datasets. Minimal and maximal values for all three axes for outdoor datasets also follow the point cloud ranges for vehicle class. For selecting indoor dataset constraints the room size may be considered as 6.4×6.4×2.56 meters. Voxels size s may be doubled from 0.04 to 0.08 to increase memory efficiency.

Training. According to an embodiment, during training, $L_{indoor}/L_{extra}$ is optimized for indoor datasets and $L_{outdoor}$ is optimized for outdoor datasets. Adam optimizer may be used with an initial learning rate set to 0.0001 and weight decay of 0.0001. The implementation may be based on the MMDetection framework and uses its default training settings. The network may be trained for 12 epochs, and the learning rate may be reduced by ten times after the 8th and 11th epoch. For ScanNet, SUN RGB-D, and KITTI, each scene may be shown to the network three times every training epoch. 8 Nvidia Tesla P40 GPUs were used for training, distributing one scene (multi-view scenario) or four images (monocular scenario) per GPU. Horizontal flip may be randomly applied during training and inputs in monocular experiments may be resized by no more than 25% of their original resolution. Moreover, in indoor scenes, 3D voxel representations may be augmented similar to point cloud-based methods, so a voxel grid center may be shifted by at most 1 m along each axis.

Inference. According to an embodiment, during inference, outputs may be filtered with a Rotated NMS algorithm, which is applied to objects projections onto the ground plane.

According to an embodiment, the method of the disclosure may be executed/implemented on any user/electronic device (such as, for example, a smartphone, a tablet, navigation system, in-vehicle equipment, a notebook, a smartwatch etc.). Such user/electronic devices or any other computing devices may be provided with computing means including, but not limited to, a processor, neural processing unit (NPU), graphics processing unit (GPU). In the non-limiting the computing means may be implemented as a special-purpose integrated circuit (ASIC), a user-programmable gate array (FPGA), or a system-on-chip (SoC). Such user devices or any other user computing devices may also comprise memory (RAM, ROM), a (touch) screen, I/O means, a camera, communication means and so on.

According to an embodiment, the method of the disclosure may also be embodied on computer-readable medium having stored thereon computer-executable instructions that when executed by processing or computing means of a device, cause the device to perform any step(s) of the proposed technical solution. Any types of data made be processed by the intelligent systems trained using the above-described approaches. Learning phase may be performed online or offline. Trained neural networks (in the form of weights and other parameters/computer-executable instructions) may be communicated to the user device and stored thereon for being used at the inference (in-use) stage.

According to an embodiment, at least one of the plurality of parts/modules may be implemented through an AI model. A function associated with AI may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

According to an embodiment, the one or a plurality of processors may control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

According to an embodiment, the learning algorithm may be a method for training a predetermined target device using a plurality of learning data to cause, allow, or control the target device to make an image synthesis, a determination or prediction. Examples of learning algorithms include, but are not limited to, supervised learning, unsupervised learning, semi-supervised learning, or reinforcement learning and so on.

According to an embodiment, the apparatus and/or the method of the disclosure, may be implemented in mobile robots/vehicles navigation systems or as mobile applications that perform scene understanding and object recognition. According to an embodiment, the apparatus and/or the method of the disclosure may be designed for scene analysis and object recognition. The obtained results can be employed in a wide range of tasks, where decisions are based on the scene and its objects. For instance, the method, when executed as software, can supply mobile robotic devices vehicle navigation systems with spatial information for planning a trajectory, gripping and manipulating objects. Furthermore, in a mobile application, the proposed solution can be used to automatically generate prompts about a scene for a user.

The disclosed invention is designed to detect and recognize three-dimensional objects, and estimate their spatial position. The task formulation follows the classical problem statement of 3D object detection, formulated by the scientific computer vision community.

According to an embodiment, the apparatus and/or the method of the disclosure may be executed as a software solution in mobile robotic devices/vehicle navigation systems, or launched on smartphones as a part of a mobile application. According to an embodiment, a subject device should meet technical requirements, for example, the subject device should have a sufficient amount of RAM and computational resources. The required amount of resources depends on the device's function, camera parameters, and performance requirements.

Modifications and improvements to the above-described implementations of the disclosure may become apparent to those skilled in the art. The foregoing description is intended to be exemplary rather than limiting. The scope of the disclosure is therefore intended to be limited solely by the scope of the appended claims.

While the above-described embodiments have been described and shown with reference to particular steps performed in a particular order, it will be understood that these operations may be combined, sub-divided, or reordered without departing from the teachings of the disclosure. Accordingly, an order and grouping of the steps is not a limitation of the disclosure. The use of the singular form in relation to any element disclosed in this application does not preclude that two or more such elements may be in an actual implementation and vice versa.

What is claimed is:

1. A method of three-dimensional (3D) object detection using an object detection neural network comprising a two-dimensional (2D) feature extracting part, a 3D feature extracting part, and an outdoor object detecting part comprising parallel 2D convolutional layers for classification and location, which are pre-trained in end-to-end manner based on posed monocular images, the method comprising:
    receiving one or more monocular images;
    extracting 2D feature maps from each one of the one or more monocular images by passing the one or more monocular images through the 2D feature extracting part of the object detection neural network,
    generating an averaged 3D voxel volume based on the 2D feature maps,
    extracting a 2D representation of 3D feature maps from the averaged 3D voxel volume by passing the averaged 3D voxel volume through an encoder of the 3D feature extracting part of the object detection neural network, and
    performing 3D object detection as 2D object detection in a Bird's Eye View (BEV) plane, the 2D object detection in the BEV plane being performed by passing the 2D representation of 3D feature maps through the outdoor object detecting part of the object detection neural network.

2. The method of claim 1, wherein the method is performed by an electronic device of a vehicle comprising at least one camera configured to detect one or more 3D objects in a surrounding area of the vehicle.

3. The method of claim 1, further comprising, for each image of the one or more monocular images, aggregating features in the 2D feature maps corresponding to the respective image via a Feature Pyramid Network (FPN).

4. The method of claim 1, wherein the generating the averaged 3D voxel volume further comprises:
    for each image of the one or more monocular images, generating a 3D voxel volume corresponding to the respective image using a pinhole camera model that determines a correspondence between 2D coordinates in the corresponding 2D feature maps and 3D coordinates in the 3D voxel volume;
    for each of the 3D voxel volume, defining a binary mask corresponding to the respective 3D voxel volume, wherein the binary mask indicates, for each voxel in the 3D voxel volume, whether the respective voxel is inside a camera frustrum of the corresponding image;
    for each of the 3D voxel volume, the corresponding binary mask, and the corresponding 2D feature maps, projecting features of the 2D feature maps for each of the voxel inside in the 3D voxel volume as defined by the binary mask;
    producing an aggregated binary mask by aggregating the binary masks defined for the 3D voxel volumes of all of the one or more monocular images; and
    generating the averaged 3D voxel volume by averaging the features projected in the 3D voxel volumes of all of the one or more monocular images for each of the voxel inside in the 3D voxel volume in the averaged 3D voxel volume as defined by the aggregated binary mask.

5. The method of claim 1, wherein the object detection neural network is trained on one or more outdoor training datasets by optimizing a total outdoor loss function based at least on a location loss, a focal loss for classification, and a cross-entropy loss for direction.

6. A method of three-dimensional (3D) object detection using an object detection neural network comprising a two-dimensional (2D) feature extracting part, a 3D feature extracting part, and an indoor object detecting part comprising 3D convolutional layers for classification, centerness, and location, which are pre-trained in end-to-end manner based on posed monocular images, the method comprising:
    receiving one or more monocular images,
    extracting 2D feature maps from each one of the one or more monocular images by passing the one or more monocular images through the 2D feature extracting part of the object detection neural network,
    generating an averaged 3D voxel volume based on the 2D feature maps,
    extracting refined 3D feature maps from the averaged 3D voxel volume by passing the averaged 3D voxel volume through the 3D feature extracting part of the object detection neural network, and
    performing 3D object detection by passing the refined 3D feature maps through the indoor object detecting part of the object detection neural network using dense voxel representation of intermediate features.

7. The method of claim 6, wherein the method is performed by an electronic device comprising at least one camera configured to detect one or more 3D objects in a surrounding area of the electronic device, and
    wherein the electronic device is one of a smartphone, a tablet, smart glasses, or a mobile robot.

8. The method of claim 6, further comprising, for each image of the one or more monocular images, aggregating features in the 2D feature maps corresponding to the image via a Feature Pyramid Network (FPN).

9. The method of claim 6, wherein the generating the averaged 3D voxel volume further comprises:
    for each image of the one or more monocular images, generating a 3D voxel volume corresponding to the respective image using a pinhole camera model that determines a correspondence between 2D coordinates in the corresponding 2D feature maps and 3D coordinates in the 3D voxel volume;
    for each of the 3D voxel volume, defining a binary mask corresponding to the respective 3D voxel volume, wherein the binary mask indicates, for each voxel in the 3D voxel volume, whether the respective voxel is inside a camera frustrum of the corresponding image;
    for each of the 3D voxel volume, the corresponding binary mask, and the corresponding 2D feature maps, projecting features of the 2D feature maps for each of the voxel inside in the 3D voxel volume as defined by the binary mask;

producing an aggregated binary mask by aggregating the binary masks defined for the 3D voxel volumes of all of the one or more monocular images; and generating the averaged 3D voxel volume by averaging the features projected in the 3D voxel volumes of all of the one or more monocular images for each of the voxel inside in the 3D voxel volume in the averaged 3D voxel volume as defined by the aggregated binary mask.

10. The method of claim 6, wherein the object detection neural network is trained on one or more indoor training datasets by optimizing a total indoor loss function based on at least one of a focal loss for classification, a cross-entropy loss for centerness, or an Intersection-over-Union (IoU) loss for location.

11. The method of claim 6, wherein the object detection neural network further comprises a scene understanding part, which is pre-trained in end-to-end manner, the method further comprising:
performing global average pooling of the extracted 2D feature maps to obtain a tensor representing the extracted 2D feature maps, and estimating a 1 by passing the tensor through the scene understanding part configured to jointly estimate camera rotation and 3D layout of a scene, and wherein the scene understanding part comprises two parallel branches: two fully connected layers that output 3D scene layout and two fully other connected layers that estimate camera rotation.

12. The method of claim 11, wherein the method is performed by an electronic device to understand the scene in a surrounding area of the electronic device, wherein the electronic device is one of a smartphone, a tablet, smart glasses, or a mobile robot, and wherein the electronic device includes at least one camera configured to capture the scene.

13. The method of claim 11, wherein the scene understanding part of the object detection neural network is trained on one or more indoor training datasets by optimizing a total scene understanding loss function based on at least one of a layout loss or a camera rotation estimation loss.

14. An electronic device mounted on a vehicle comprising at least one camera, and configured to use an object detection neural network including a two-dimensional 2D feature extracting part, a 3D feature extracting part, and an outdoor object detecting part including parallel 2D convolutional layers for classification and location, which are pre-trained in end-to-end manner based on posed monocular images, the electronic device comprising:

a memory storing one or more instructions; and
a processor configured to execute the one or more instructions to:
receive one or more monocular images;
extract 2D feature maps from each one of the one or more monocular images by passing the one or more monocular images through the 2D feature extracting part of the object detection neural network,
generate an averaged 3D voxel volume based on the 2D feature maps,
extract a 2D representation of 3D feature maps from the averaged 3D voxel volume by passing the averaged 3D voxel volume through an encoder of the 3D feature extracting part of the object detection neural network,
perform 3D object detection as 2D object detection in a Bird's Eye View (BEV) plane, the 2D object detection in the BEV plane being performed by passing the 2D representation of 3D feature maps through the outdoor object detecting part of the object detection neural network; and
detect one or more 3D objects in a surrounding area of the vehicle based on 3D object detection.

15. An electronic device comprising at least one camera, and configured to use an object detection neural network including a two-dimensional (2D) feature extracting part, a 3D feature extracting part, and an indoor object detecting part including 3D convolutional layers for classification, centerness, and location, which are pre-trained in end-to-end manner based on posed monocular images, the electronic device comprising:

a memory storing one or more instructions; and
a processor configured to execute the one or more instructions to:
receive one or more monocular images,
extract 2D feature maps from each one of the one or more monocular images by passing the one or more monocular images through the 2D feature extracting part of the object detection neural network,
generate an averaged 3D voxel volume based on the 2D feature maps,
extract refined 3D feature maps from the averaged 3D voxel volume by passing the averaged 3D voxel volume through the 3D feature extracting part of the object detection neural network,
perform 3D object detection by passing the refined 3D feature maps through the indoor object detecting part of the object detection neural network using dense voxel representation of intermediate features; and
detect one or more 3D objects in a surrounding area of the electronic device based on the 3D object detection.

16. The electronic device of claim 15, wherein the electronic device is one of a smartphone, a tablet, smart glasses, or a mobile robot.

17. A non-transitory computer readable medium storing computer executable instructions that when executed by a processor cause the processor to perform a method of three-dimensional (3D) object detection using an object detection neural network including a two-dimensional 2D feature extracting part, a 3D feature extracting part, and an outdoor object detecting part including parallel 2D convolutional layers for classification and location, which are pre-trained in end-to-end manner based on posed monocular images, the method comprising:

receiving one or more monocular images;
extracting 2D feature maps from each one of the one or more monocular images by passing the one or more monocular images through the 2D feature extracting part of the object detection neural network,
generating an averaged 3D voxel volume based on the 2D feature maps,
extracting a 2D representation of 3D feature maps from the averaged 3D voxel volume by passing the averaged 3D voxel volume through an encoder of the 3D feature extracting part of the object detection neural network, and
performing 3D object detection as 2D object detection in a Bird's Eye View (BEV) plane, the 2D object detection in the BEV plane being performed by passing the 2D representation of 3D feature maps through the outdoor object detecting part of the object detection neural network.

\* \* \* \* \*